United States Patent
Sato et al.

(10) Patent No.: US 6,738,332 B2
(45) Date of Patent: May 18, 2004

(54) OPTICAL INFORMATION RECORDING AND REPRODUCING APPARATUS

(75) Inventors: Mitsuru Sato, Tsurugashima (JP); Takanori Maeda, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 600 days.

(21) Appl. No.: 09/815,308

(22) Filed: Mar. 23, 2001

(65) Prior Publication Data

US 2001/0055257 A1 Dec. 27, 2001

(30) Foreign Application Priority Data

Mar. 23, 2000 (JP) .......................................... 2000-81390

(51) Int. Cl.$^7$ ................................................ G11B 7/00
(52) U.S. Cl. ................................ 369/53.28; 369/112.02; 369/53.19
(58) Field of Search ........................... 369/44.11, 44.23, 369/44.26, 44.31, 44.32, 53.11, 53.12, 53.18, 53.19, 53.23, 53.28, 112.01, 112.02

(56) References Cited

U.S. PATENT DOCUMENTS

| | | | |
|---|---|---|---|
| 5,859,818 A | * | 1/1999 | Tateishi et al. ......... 369/112.02 |
| 6,137,754 A | * | 10/2000 | Furukawa et al. ........ 369/44.32 |
| 6,584,058 B1 | * | 6/2003 | Yoshikawa et al. ..... 369/112.02 |
| 6,643,230 B2 | * | 11/2003 | Furukawa ................ 369/44.23 |
| 6,661,415 B1 | * | 12/2003 | Yasuda et al. ........... 369/53.19 |
| 6,661,750 B2 | * | 12/2003 | Saimi et al. ............. 369/44.23 |

* cited by examiner

Primary Examiner—Thang V. Tran
Assistant Examiner—Bach Vuong
(74) Attorney, Agent, or Firm—Sughrue Mion, PLLC (57) ABSTRACT

An optical information recording and reproducing apparatus capable of recording and reproducing information data accurately with respect to an optical recording medium. The optical information recording and reproducing apparatus includes an aberration correction part which corrects aberration of the optical system. The apparatus determines whether or not an aberration correction by the aberration correction part is completed based on the signal level read from the optical recording medium, while changing a spherical aberration correction amount of the aberration correction part. The apparatus commences a recording operation or a reproducing operation of the optical information recording and reproducing apparatus if it is determined that the aberration correction was completed.

8 Claims, 9 Drawing Sheets

OPTICAL INFORMATION RECORDING AND REPRODUCING APPARATUS

BACKGROUND OF THE INVENTION

1. Field of the Invention

The present invention relates to an optical information recording and reproducing apparatus which records and reproduces information data on an optical recording medium.

2. Description of the Related Art

An optical disk used as an optical recording medium includes a transparent substrate of a predetermined thickness for covering and protecting the recording surface of the disk. An optical information recording and reproducing apparatus executes reading and recording of information data with respect to the optical disk by irradiating a reading beam or a recording beam on the recording surface through the transparent substrate of such an optical disk.

However, the occurrence of aberrations such as a spherical aberration and frame aberrations generates a problem which decreases the recording and reproducing accuracy of information data.

For example, it is difficult to form the thicknesses of the transparent substrates of all optical disks to be of a predetermined value during manufacture of the disks, and typically, thickness errors of several tens of $\mu m$ may arise. Further, a disk having a plurality of recording layers, for example, DVD (Digital Versatile Disk), has different thicknesses in the transparent substrate from the surface of the disk to each recording layer. As a result, a spherical aberration is generated by the thickness error in such a transparent substrate, and this aberration decreases the accuracy of the recording and reproducing of information data.

OBJECTS AND SUMMARY OF THE INVENTION

The present invention has been made to solve such problems, and the object of the present invention is to provide an optical information recording and reproducing apparatus which is capable of recording and reproducing information data accurately with respect to an optical recording medium.

An optical information recording and reproducing apparatus according to the present invention which executes recording and reproducing of information data with respect to an optical recording medium, comprises an optical system for photoelectrically converting a reflected light from said optical record medium into a conversion signal, while irradiating a recording surface of said optical recording medium with a laser beam; an aberration correction part for correcting an aberration of said optical system; an aberration correction completion determining part for determining whether or not an operation of an aberration correction by said aberration correction part was completed based on the level of said conversion signal; and a controller for starting a recording operation or a reproducing operation if it is determined that the operation of said aberration correction was completed by said aberration correction completion determining part, while changing an amount of said aberration correction.

DETAILED DESCRIPTION OF THE PREFERRED EMBODIMENTS

Embodiments of the present invention will be described below with reference to drawings.

Figure 1:
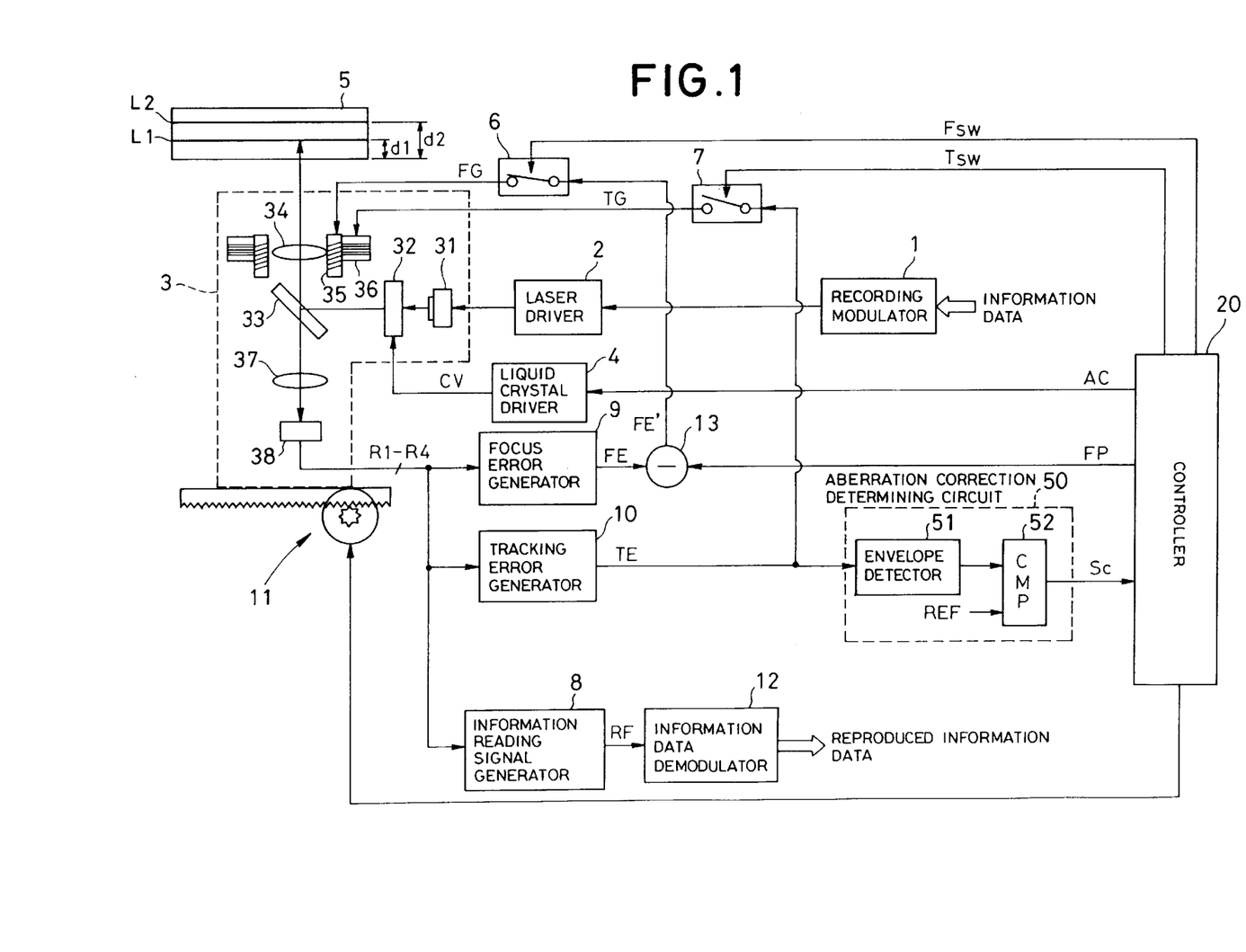
FIG. 1 is a diagram showing a structure of an optical information recording and reproducing apparatus according to the present invention.

FIG. 1 is a diagram showing a structure of an optical information recording and reproducing apparatus according to the present invention.

In FIG. 1, a recording modulator 1 executes modulation processing for input information data in accordance with a desired recording modulating system and supplies recording signals obtained in this stage to a laser driver 2. The laser driver 2 generates a laser driving signal having a level corresponding to the recording signal at the time of the recording operation of the optical information recording and reproducing apparatus. The laser driver 2 supplies the laser driving signal to a laser generator 31 mounted on a recording and reproducing head 3. Further, the laser driver 2 generates a laser driving signal having a predetermined fixed level at the time of the reproducing operation of the optical information recording and reproducing apparatus. The laser driver 2 supplies the laser driving signal to the laser generator 31. The laser generator 31 generates a laser beam having light power corresponding to the laser driving signal. That is, while the laser generator 31 generates a laser beam having a predetermined reading light power at the time of reproducing operation, it generates a laser beam having light power which is needed at the time of data recording on the optical disk 5 or data erasing therefrom during a recording or erasing operation. Then, the laser generator 31 irradiates the laser beam on a liquid crystal panel 32.

Figure 2:
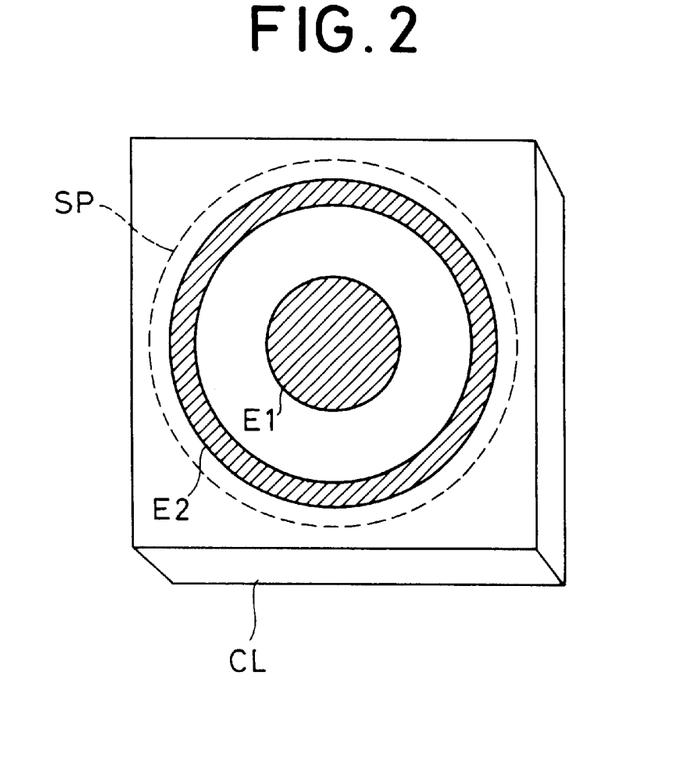
FIG. 2 is a perspective view showing a structure of a liquid crystal panel 32.

FIG. 2 is a perspective view showing a structure of the liquid crystal panel 32 viewed from the direction of the optical axis of the laser beam.

As shown in FIG. 2, the liquid crystal panel 32 comprises a circular transparent electrode E1, an annular transparent electrode E2 and a liquid crystal layer CL filled with liquid crystal molecules having birefringence properties. In the case where the lens diameter of the objective lens 34, which will be described later, is 3000 µm, the diameter of the transparent electrode E1 is for example about 1600 µm and the outer diameter of the transparent electrode E2 is about 2800 µm. A predetermined potential (for example, 2 volts) is fixedly applied to the transparent electrode E1, while a liquid crystal drive potential CV from the liquid crystal driver 4 is applied to the transparent electrode E2. The liquid crystal driver 4 generates the liquid crystal drive potential CV having potential according to the spherical aberration correcting signal AC supplied from the controller 20. When such liquid crystal drive potential CV is applied to the liquid crystal panel 32, the twist angle of the liquid crystal molecules which exist in the region covered with the transparent electrode E2 among the liquid crystal molecules filled in the liquid crystal layer CL is shifted by the angle according to the liquid crystal drive potential CV. That is, the twist angle of this liquid crystal molecules is shifted only by the angle according to the spherical aberration correcting signal AC. Thus, when the beam spot SP of a laser beam is irradiated on the liquid crystal panel 32, as shown in FIG. 2, a phase difference according to the above-mentioned liquid crystal drive potential CV is produced between the light which passes through the region covered with the transparent electrode E2 and the light which passes through other regions. That is, the liquid crystal panel 32 allows the laser beam with the above-mentioned phase difference with respect to the wave surface of the laser beam light, which was supplied from the laser generator 31, to be output and passed through a half mirror 33. By such an operation the liquid crystal panel 32 corrects the spherical aberration due to the thickness difference in the transparent substrate of the optical disk.

The half mirror 33 conducts the laser beam supplied from the liquid crystal panel 32 to the objective lens 34. The objective lens 34 condenses the laser beam supplied from the half mirror 33 and irradiates the condensed laser beam on the recording surface of the optical disk 5. The optical disk 5 is an optical recording medium such as a DVD having two recording layers L1 and L2. In this embodiment, as shown in FIG. 1, the recording layer L1 has a thickness of d1 in the transparent substrate from the incident surface for the laser beam, and the recording layer L2 has a thickness of d2. The focussing actuator 35 moves the objective lens 34 by a distance according to a focus drive signal FG supplied from a servo loop switch 6 in the perpendicularly to the optical disk 5, that is, on what is called a focus adjusting track. The tracking actuator 36 shifts the optical axis of the objective lens 34 by a distance according to the tracking drive signal TG supplied from the servo loop switch 6 in the radial direction of the optical disk 5.

At this point, the reflected light obtained when the laser beam is irradiated on the recording surface of the optical disk 5, is irradiated on the light receiving surface of a photo detector 38 through the objective lens 34, the half mirror 33 and a condenser lens 37.

Figure 3:
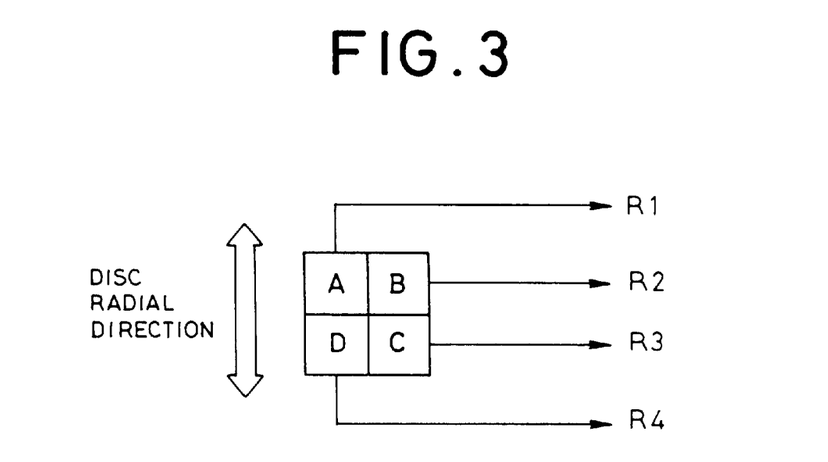
FIG. 3 is a diagram showing a light receiving surface of a photo detector 38.

FIG. 3 is a diagram showing the light receiving surface of the photo detector 38.

As shown in FIG. 3, the photo detector 38 includes four separate light receiving devices A to D arranged with respect to the recording track direction formed on the recording surface of the optical disk 5. Each of the light receiving devices A to D receives the reflected light supplied from the condenser lens 37 and outputs the light converted to electric signals as photoelectric conversion signals R1 to R4, respectively. The photo detector 38 supplies these photoelectric conversion signals R1 to R4 to each of the information reading signal generator 8, the focus error generator 9 and the tracking error generator 10.

A slider mechanism 11 transfers a recording and reproducing head 3, which includes the laser generator 31 the liquid crystal panel 32, the half mirror 33, the objective lens 34, the focussing actuator 35, the tracking actuator 35, the condenser lens 37 and the photo detector 38, in the disk radial direction of the optical disk 5. The information reading signal generator 8 supplies the addition result obtained by adding the photo electric conversion signals R1 to R4 to each other to an information data demodulator 12 as a reading signal RF. The information data demodulator 12 reconstructs the information data recorded in the optical disk 5 by conducting a predetermined demodulation processing with respect to the reading signal RF and outputs the data as reproduced information data.

The focus error generator 9 obtains the sums of the outputs of the light receiving devices A to D diagonally positioned, respectively in the receiving devices A to D in the photo detector 38, and obtains the differential values therebetween as a focus error signal FE which indicates the degree of a focus shift. That is, the focus error generator 9 obtains the focus error signal FE by the operation of the following equation.

$$FE=(R1+R3)-(R2+R4)$$

The focus error generator 9 applies the focus error signal FE to a subtracter 13. The subtracter 13 supplies a focus error signal FE' obtained by subtracting the focus adjusting position signal FP supplied from the controller 20 from the focus error signal FE, to the servo loop switch 6. The servo loop switch 6 maintains one of an on state and off state according to the focus servo switch signal $F_{sw}$ supplied from the controller 20. For example, when the focus servo switch signal $F_{sw}$ for the logic level "0", which shows the focus servo is off, is supplied, the servo loop switch 6 is in the off state. On the other hand, when the focus servo switch signal $F_{sw}$ for a logic level "1", which shows that the focus servo is on, is supplied, the servo loop switch 6 is in the on state, and commences supply of the focus drive signal FG according to the above-mentioned focus error signal FE' to the focussing actuator 35. Namely, a system comprising the recording and reproducing head 3, the focus error generator 9, the subtracter 13 and the servo loop switch 6 forms what is called a focus servo loop. By the operation of such focus servo loop the objective lens 34 is held at a position on the focus adjusting track according to the focus adjusting position signal FP. Therefore, when the focus adjusting position signal FP for aligning the recording layer L1 with the focus, is supplied from the controller 20, the objective lens 34 is driven so that the focus of the laser beam is aligned with the recording surface of the recording layer L1. Further, when the focus adjusting position signal FP for aligning the recording layer L2 of the optical disks 5 with the focus, is supplied from the controller 20, the objective lens 34 is driven so that the focus of the laser beam is aligned with the recording surface of the recording layer L2.

The tracking error generator 10 obtains the difference between the outputs of the light receiving devices A to D positioned in the tracking direction respectively in the receiving devices A to D in the photo detector 38, and supplies this output difference to each of the servo loop switch 7 and the aberration correction completion determining circuit 50 as a tracking error signal TE. That is, the tracking error generator 10 obtains the tracking error signal FE by the operation of the following equation.

$$TE = (R1+R2) - (R3+R4)$$

After that, the tracking error generator 10 supplies the tracking error signal TE to each of the servo loop switch 7 and the aberration correction completion determining circuit 50. The servo loop switch 7 maintains one of an on state and off state according to the tracking servo switch signal $T_{sw}$ supplied from the controller 20. For example, when the tracking servo switch signal $T_{sw}$ for the logic level "1", which shows the tracking servo is on, is supplied, the servo loop switch 7 is in the on state, and commences supply of the tracking drive signal TG according to the above-mentioned tracking error signal to each of the tracking actuator 36 and the slider mechanism 11. On the other hand, when the tracking servo switch signal $T_{sw}$ for the logic level "0", which indicates that the tracking servo is off, is supplied, the servo loop switch 7 becomes the off state, and each of the tracking actuator 36 and the slider mechanism 11 stops the operation. Namely, a system comprising the recording and reproducing head 3, the tracking error generator 10, the slider mechanism 11 and the servo loop switch 7 forms what is called a tracking servo loop. In this case, when the servo loop switch 7 is in the off state, the above-mentioned tracking servo loop is in the open state. In contrast, when the servo loop switch 7 is in the on state, the above-mentioned tracking servo loop is in the closed state. Accordingly, the slider mechanism 11 and the tracking actuator 36 are driven and controlled so that the laser beam from the objective lens 34 follows the recording tracks which are formed on the recording layers L1 and L2 of the optical disk 5.

An envelope detector 51 of the aberration correction completion determining circuit 50 detects an envelope level of the tracking error signal TE and supplies the envelope level to a comparator 52. The comparator 52 compares the levels between such an envelope level and a predetermined reference level REF.

At this time, when the envelope level is smaller than the reference level REF, the comparator 52 supplies a correction completion signal $S_c$ of the logic level "0" which indicates that the spherical aberration correction has not been completed by the liquid crystal panel 32 to the controller 20. On the other hand, when the envelope level is larger than the reference level REF, the comparator 52 supplies a correction completion signal $S_c$ of the logic level "1" which indicates that the spherical aberration correction has been completed by the liquid crystal panel 32 to the controller 20.

Figure 4:
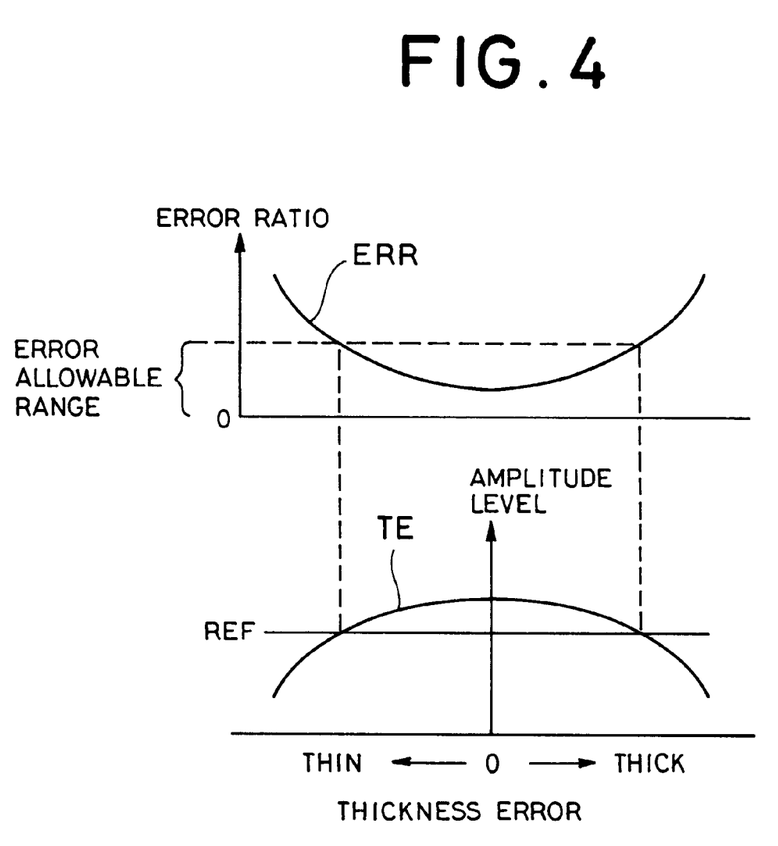
FIG. 4 is a relationship between the amplitude level of a tracking error signal TE and the error ratio at the reading of information or at the recording of information.

That is, as shown in FIG. 4, when the amplitude level of the tracking error signal TE is larger than the reference level REF, the error ratio ERR at the time of reading information or at the time of recording information ranges within an error allowable range where no hitch occurs during information reproducing and recording. At this point, when the amplitude level of the tracking error signal TE becomes larger than the reference level REF, the aberration correction completion determining circuit 50 determines that the spherical aberration has been completed by the liquid crystal panel 32.

When an operation of the reproducing commencement is performed by a user, the controller 20 performs various reproduction controls for reproducing the record information from the optical disk 5. By such reproduction controls, information data recorded in the recording layer L1 or L2 of the optical disk 5 is read with the recording and reproducing head 3, and the information data is output from the information data demodulator 12 as reproduced information data.

When an operation of the recording commencement is performed by a user, the controller 20 performs various recording controls for recording information data in the optical disk 5. By such recording controls, the information data supplied to the recording modulator 1 are recorded in the recording layer L1 or L2 of the optical disk 5 through the laser driver 2 and the recording and reproducing head 3. The detailed description of these reproduction controls and recording controls will be omitted.

When a recording layer in which reproducing or recording is to be carried out is changed, for example, from the recording layer L2 to the recording layer L1 during the execution of such reproduction controls and recording controls, the controller 20 controls according to the following steps.

First, the controller 20 supplies the focus adjusting position signal FP for changing the focus of the laser beam from the recording layer L2 to the recording layer L1, to the subtracter 13. In accordance with this operation, the focusing actuator 35 performs driving of the objective lens 34 so as to shift the focus of the laser beam, which is irradiated to the optical disk 5, from the recording layer L2 to the recording layer L1, what is called a focus jump. Then, when the focus of the laser beam has agreed with the recording layer L1, the controller 20 proceeds to the execution of the spherical aberration correction control routine as shown in FIG. 5.

Figure 5:
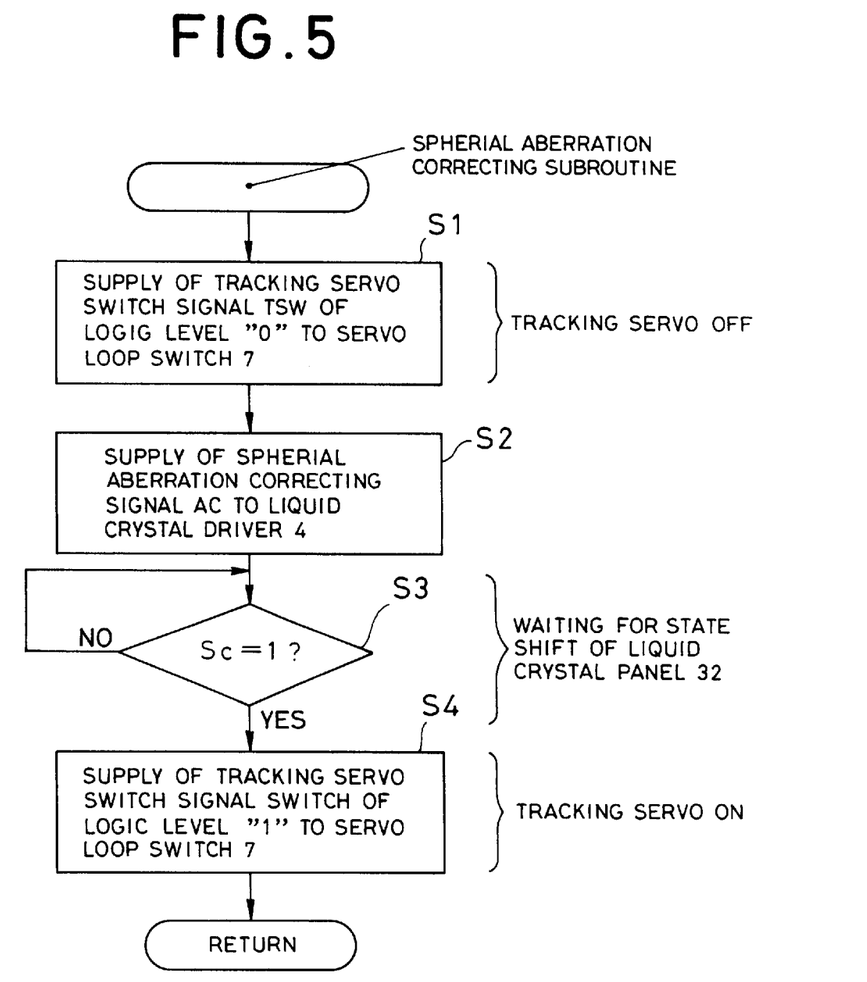
FIG. 5 is a diagram showing the spherical aberration correction subroutine in the optical information recording and reproducing apparatus according to the present invention.

In FIG. 5, first, the controller 20 supplies the tracking servo switch signal $T_{sw}$ of the logic level "0", which indicates that the tracking servo is off, to the servo loop switch 7 (step S1). By such execution of step S1 the tracking servo becomes the off state, and temporarily stops the reproducing or recording operation which is being executed. Next, the controller 20 supplies a spherical aberration correction signal AC corresponding to an predictive amount of the spherical aberration which is predicted to be generated by the thickness d1 of the transparent substrate of the optical disk 5, to the liquid crystal driver 4 (step S2). By such execution of step S2 the liquid crystal panel 32 corrects a spherical aberration which is generated by the shift of the thickness of the transparent substrate from the incident surface of the optical disk 5 to the recording layer to d1. A value which indicates a predictive amount of the spherical aberration, which is predicted to be generated by the thickness d1 of the transparent substrate is previously stored, for example, in a memory (not shown) contained in the controller 20 or the like.

Next, the controller 20 repeatedly determines whether or not the logic level of a correction completion signal $S_c$ supplied from the aberration correction completion determining circuit 50 is "1" (step S3).

In the above-described step S3, if the logic level of the correction completion signal $S_c$ is determined to be "1", the controller 20 then supplies a tracking servo switch signal $T_{sw}$ having the logic level of "1", which indicates that the tracking servo is on, to the servo loop switch 7 (step S4). After the execution of step S4, the controller 20 performs this spherical aberration correction subroutine and returns to the execution of the aforementioned reproduction control (or recording control). Thus, by such execution of step S4 the tracking servo returns to the on state, and the reproducing or recording operation, which was temporarily stopped in the stage of step S1, is resumed.

That is, in the spherical aberration correction control routine shown in FIG. 5, if the recording layer for reproducing or recording is changed from L2 to L1, the reproducing operation or the recording operation is stopped temporarily, and a spherical aberration correction of the correction amount according to the change in the recording layer is performed by the liquid crystal panel 32. At this time, since the liquid crystal panel 32 has a slow response speed, it takes time from supply of the spherical aberration correction signal AC to the shift to the state of an amount of spherical aberration correction according to the spherical aberration correction signal AC. Therefore, during this shift if the level of the tracking error signal TE is larger than the reference level REF, it is determined that the spherical aberration by the liquid crystal panel 32 has been completed at that point. This reason is that if the level of the tracking error signal TE is larger than the reference level REF, the reading/writing error ratio becomes extremely low even if the liquid crystal panel 32 has not still reached a spherical aberration correction state according to the spherical aberration correction signal AC. Thus, at this point, it is determined that the spherical aberration correction by the liquid crystal panel 32 has been completed, and the reproducing operation or the recording operation is resumed. As a result, this resumption of the reproducing (or recording operation) can be performed at high speed as compared with a case where the reproducing operation (or recording operation) is resumed after perfect shift of the liquid crystal panel 32 to the spherical aberration correction state according to the spherical aberration correction signal AC.

It is noted that although in the aberration correction completion circuit 50, the determination whether or not the spherical aberration correction has been completed is carried out based on the level of the tracking error signal TE, the signal used as the reference of this determination is not limited to the tracking error signal. For example, if the optical disk 5 is a writing once DVD, determination whether or not the spherical correction has been completed based on the level of the reading signal obtained when prepit previously recorded for address was read, may be made.

Figure 6:
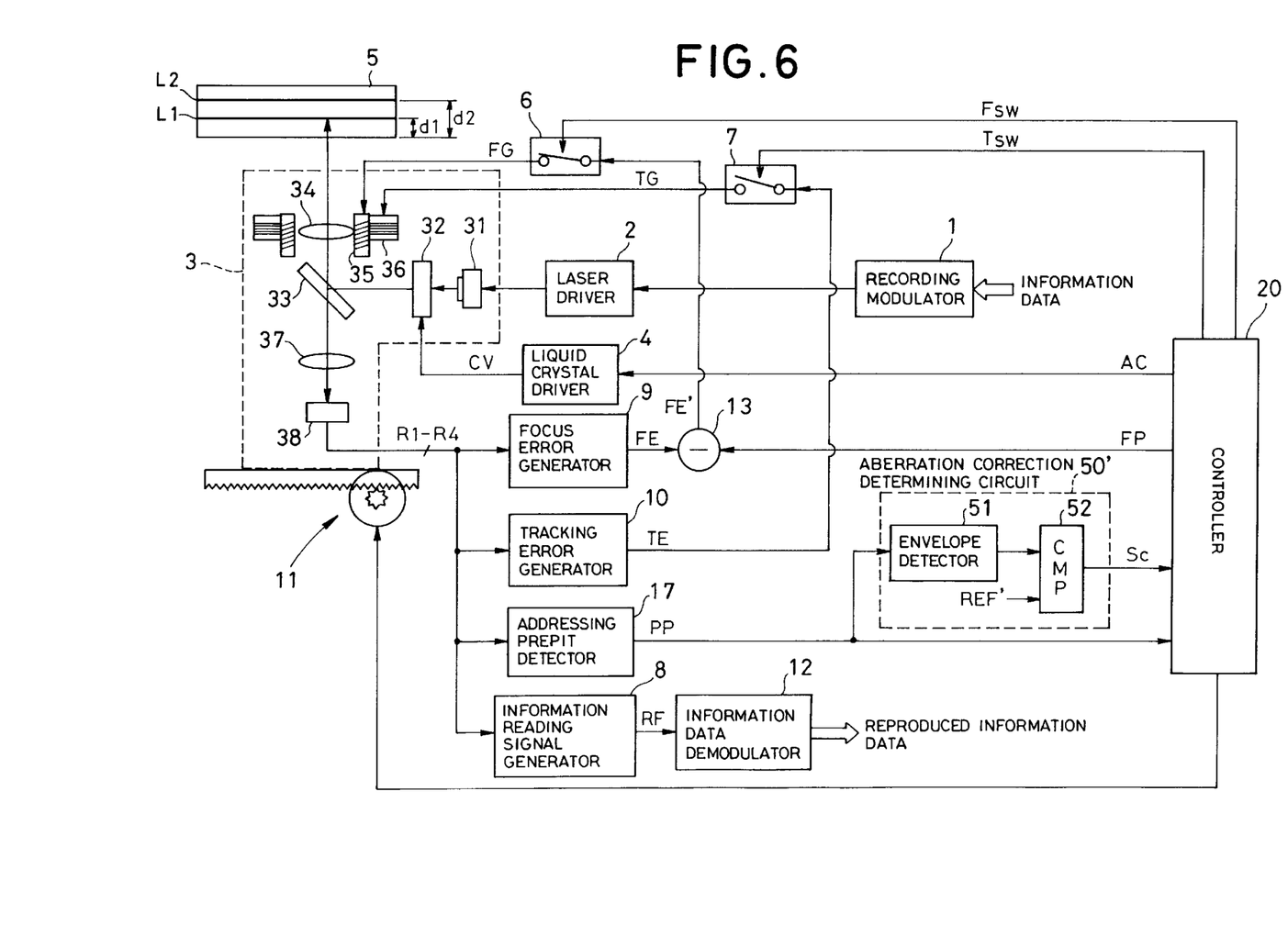
FIG. 6 is a diagram showing a structure of an optical information recording and reproducing apparatus according to another embodiment of the present invention.

FIG. 6 is a diagram showing a constitution of an optical information recording and reproducing apparatus according another embodiment of the present invention, which was made taking such points into consideration.

In the structure shown in FIG. 6, the structure other than an addressing prepit detector 17 and an aberration correction completion determining circuit 50' is the same as that shown in FIG. 1. Thus, only the addressing prepit detector 17 and an aberration correction completion determining circuit 50' will be explained below.

The addressing prepit detector 17 generates a prepit detection signal PP, which indicates that the prepit formed in the optical disk 5 was read, by the following operation using the photoelectric conversion signals R1 to R4 from the photo detector 38. The addressing prepit detector 17 then supplies the prepit detection signal PP to each of the aberration correction completion determining circuit 50' and the controller 20.

$$PP=(R1+R2)-(R3+R4)$$

The envelope detector 51 of the aberration correction completion determining circuit 50' detects an envelope level of the prepit detecting signal PP and supplies this to the comparator 52. The comparator 52 compares such an envelope level with the level of a predetermined reference level REF'. At this time, when the envelope level is larger than this reference level REF', the comparator 52 generates a correction completion signal $S_c$ of the logic level "1" indicating that the spherical aberration correction by the liquid crystal panel 32 has been completed, and supplies it to the controller 20. On the other hand, when the envelope level is smaller than this reference level REF', the comparator 52 supplies a correction completion signal $S_c$ of the logic level "0" indicating that the spherical aberration correction by the liquid crystal panel 32 has not been completed, to the controller 20.

Namely, when the amplitude level of the prepit detecting signal PP is larger than the reference level REF', the aberration correction completion determining circuit 50' determines that at this point, the spherical aberration correction by the liquid crystal panel 32 has been completed, because the reading error ratio or the writing error ratio is extremely low.

Alternatively, if thickness errors in the transparent substrate are detected based on signals read from the optical disk 5 and this thickness error has become lower than a predetermined value, the determination that the spherical aberration correction has been completed may be made.

Figure 7:
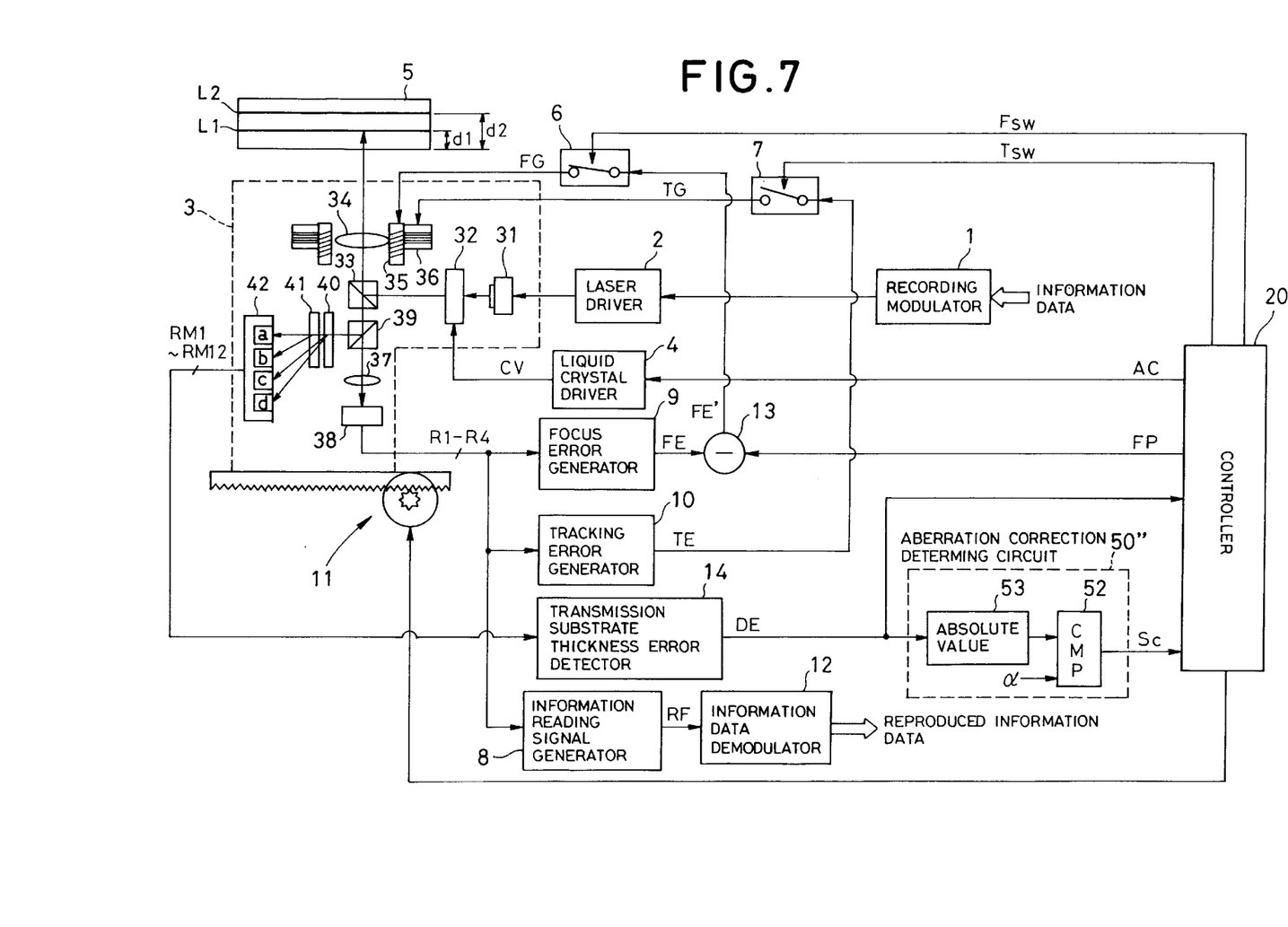
FIG. 7 is a diagram showing a structure of an optical information recording and reproducing apparatus according to another embodiment of the present invention.

FIG. 7 is a diagram showing a constitution of an optical information recording and reproducing apparatus according another embodiment of the present invention, which was made taking such points into consideration.

The constitution shown in FIG. 7 comprises the constitution of FIG. 1 and a transparent substrate thickness error detector 14. Alternatively, the constitution shown in FIG. 7 adopts an aberration correction completion determining circuit 50" in place of the aberration correction completion determining circuit 50. Further, the constitution shown in FIG. 7 newly adds a half mirror 39, hologram devices 40 and 41, and a photo detector 42 to the recording and reproducing head 3. The operation of the optical information recording and reproducing apparatus shown in FIG. 7 is the same as that of the apparatus shown in FIG. 1 except for the changed section mentioned above, and so the explanations of the operation for the changed section will be mainly executed.

The half mirror 39 in FIG. 7 conducts the reflected light from the optical disk 5 through the half mirror 33 to each of the condenser lens 37 and the hologram device 40.

Figure 8:
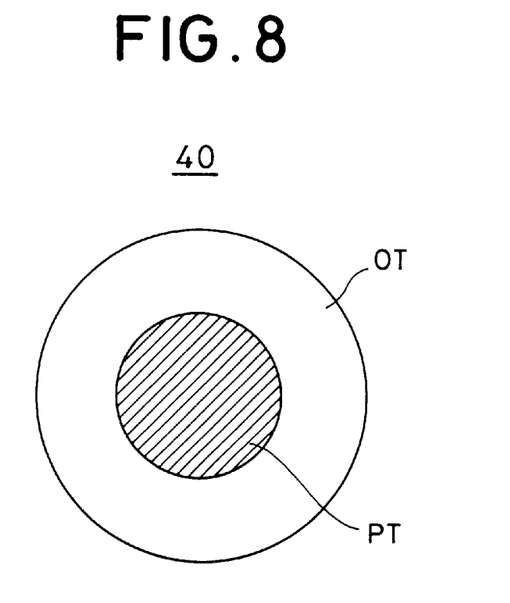
FIG. 8 is a view showing the schematic structure of a hologram device 40 in the optical information recording and reproducing apparatus shown in FIG. 7.

The hologram device 40 has a circular outside shape as shown in FIG. 8 when viewed from the optical axial direction of the reflected light supplied from the half mirror 39 and a circular hologram pattern PT is formed in the center of the device 40. The hologram pattern PT is formed on the inner side than the outer peripheral portion OT corresponding to the effective optical path in a small shape such that light from the half mirror 39 can be diffracted with a predetermined angle. The pattern PT is a straight linear type and forms a blaze shape surface so that the diffracted light energy is condensed in a particular direction. The hologram device 40 is formed so that the reflected light of the light beam passing through a region corresponding to the numerical aperture (NA) of, for example, 0.31 or less on the objective lens 34 and was irradiated to the optical disk 5 is passed through the hologram pattern PT. On the other hand, the hologram device 40 is formed so that the reflected light of the light beam passing through a region corresponding to the numerical aperture (NA) of, for example, 0.85 or less on the objective lens 34 and was irradiated on the optical disk 5 is passed through the hologram outer peripheral portion OT.

Figure 9:
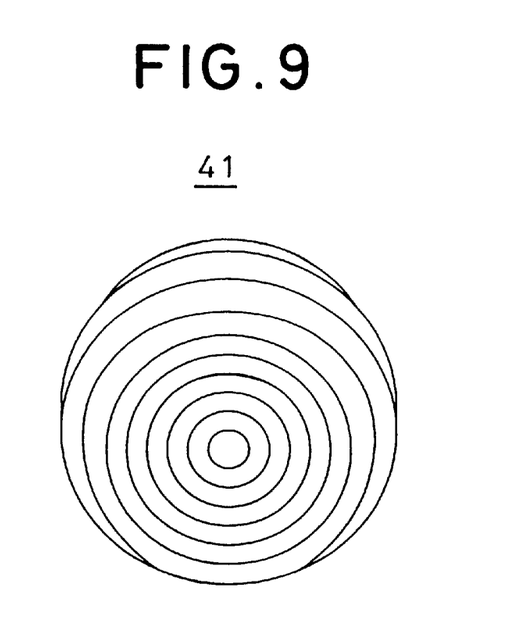
FIG. 9 is a view showing the schematic structure of a hologram device 41 in the optical information recording and reproducing apparatus shown in FIG. 7.

On the other hand, the hologram device 41 has a circular outside shape as shown in FIG. 9 when viewed from the optical axial direction of the device 41 and has a hologram pattern having a concentric shape with the center at a point deviated from the center of the outside circle, which acts as a concave lens.

These hologram devices 40 and 41 allow the reflected light from the optical disk 5 supplied through the half mirror 39 to be diffracted into four diffracted light. Then the diffracted light is irradiated on each of the photo detectors 42a to 42d arranged as shown in FIG. 7, respectively.

The photo detectors 42a to 42d each have three light receiving surfaces, convert each of the diffracted light received on each light receiving surface into photoelectric conversion signals RM1 to RM12 having signal levels corresponding to their light intensities, and supply the signals RM1 to RM12 to the transparent substrate thickness error detector 14.

Figure 10:
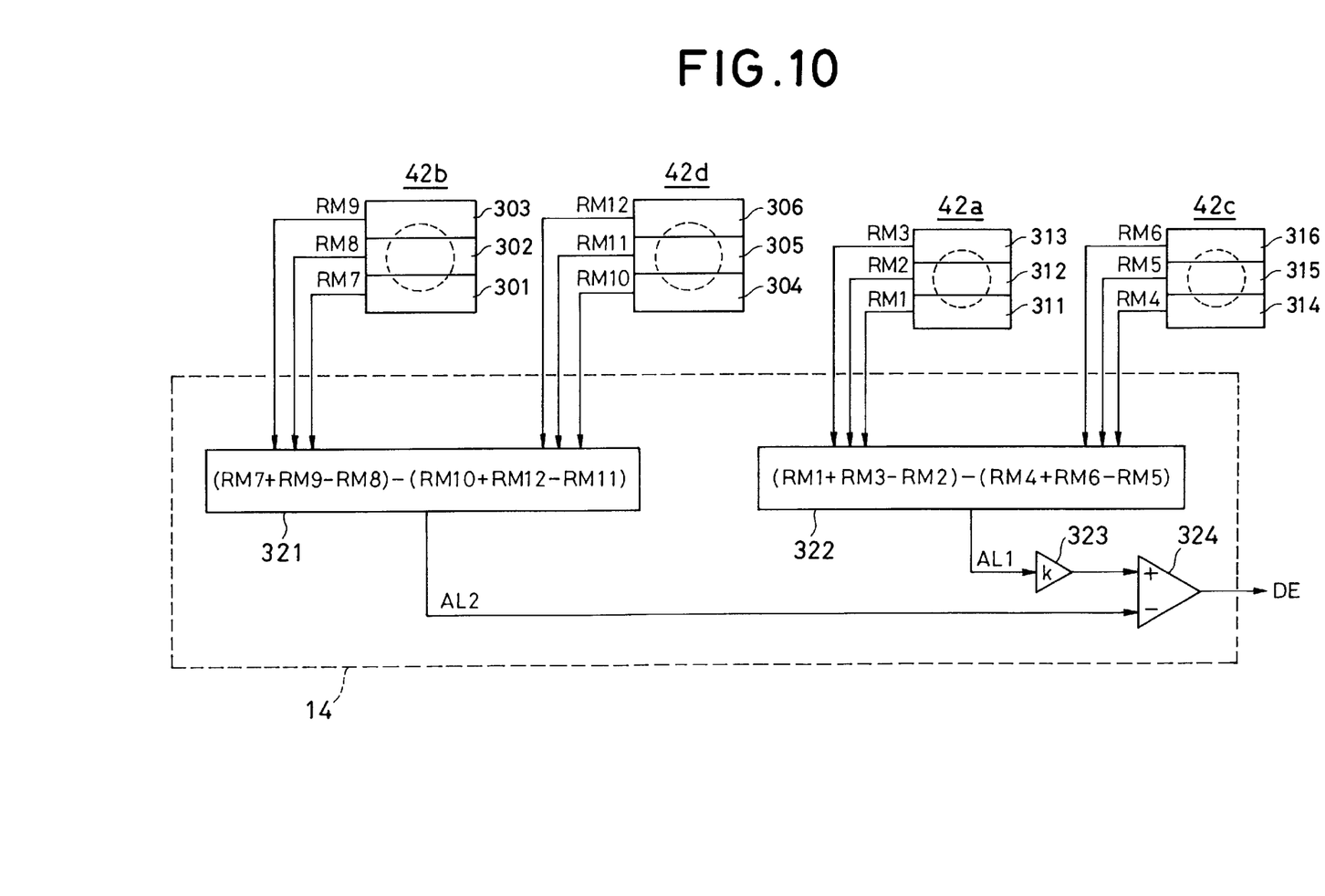
FIG. 10 is a diagram showing the internal structure of photo detectors 42a to 42d and a transparent substrate thickness error detector 14.

FIG. 10 is a diagram showing the internal constitution of the above-mentioned photo detectors 42a to 42d and the transparent substrate thickness error detector 14.

In FIG. 10, a computing circuit 322 of the transparent substrate thickness error detector 14 supplies the computed result AL1 obtained by the following computing using photoelectric conversion signals RM1 to RM3 from the light receiving surfaces 311 to 313 of the photo detector 42a respectively and photoelectric conversion signals RM4 to RM6 from the light receiving surfaces 314 to 316 of the photo detector 42c respectively to a coefficient multiplier 323.

$$AL1=(RM1+RM3-RM2)-(RM4+RM6-RM5)$$

The coefficient multiplier 323 supplies the coefficient multiplication result (k·AL1) obtained by multiplying this computed result AL1 by a predetermined coefficient k to a coefficient subtracter 324.

The computing circuit 321 of the transparent substrate thickness error detector 14 supplies the computed result AL2 obtained by the following computing using photoelectric conversion signals RM7 to RM9 from the light receiving surfaces 301 to 303 of the photo detector 42b respectively and photoelectric conversion signals RM10 to RM12 from the light receiving surfaces 304 to 306 of the photo detector 42d respectively to a subtracter 324.

$$AL2=(RM7+RM9-RM8)-(RM10+RM12-RM11)$$

The subtracter 324 outputs a value obtained by subtracting the computed value AL2 from the coefficient multiplication result (k·AL1) as a transparent substrate thickness error signal DE which indicates the error amount of the transparent substrate thickness. That is, when the transparent substrate thickness from the incident surface of a light beam to the recording layer for recording or reproducing data is larger than an ideal transparent substrate thickness, a positive polar transparent substrate thickness error signal DE is output, and in contrast, when the transparent substrate thickness is smaller than the ideal transparent substrate thickness, a negative polar transparent substrate thickness error signal DE is obtained.

The transparent substrate thickness error detector 14 supplies the transparent substrate thickness error signal DE to each of the controller 20 and the aberration correction determining circuit 50". At this time, the controller 20 supplies a spherical aberration correction signal AC for the amount according to the transparent substrate thickness error signal DE to the liquid crystal driver 4. As a result, the liquid crystal panel 32 shifts to the spherical aberration correction state according to the transparent substrate thickness error signal DE.

During this shift an absolute value circuit 53 in the aberration correction determining circuit 50" obtains the absolute value of the transparent substrate thickness error signal DE and supplies the value to the comparator 52. The comparator 52 then compares the absolute value of transparent substrate thickness error signal DE with a predetermined error allowable value a with respect to their magnitude. When the absolute value of the transparent substrate thickness error signal DE is larger than the error allowable value a, the comparator 52 supplies a correction completion signal $S_c$ of the logic level "0" indicating that the spherical aberration by the liquid crystal panel 32 has not been completed, to the controller 20. On the other hand, when the absolute value of the transparent substrate thickness error signal DE is smaller than the error allowable value a, the comparator 52 supplies a correction completion signal $S_c$ of the logic level "1" indicating that the spherical aberration by the liquid crystal panel 32 has been completed, to the controller 20. The controller 20 commences a recording operation or a reproducing operation according to this correction completion signal $S_c$ of the logic level "1".

Namely, when the spherical aberration correction is commenced by the liquid crystal panel 32, although the transparent substrate thickness of the optical disk 5 is not actually changed, the transparent substrate thickness, which is obtained by the transparent substrate thickness error detector 14, comes near the ideal transparent substrate thickness. Thus, in this shift, it is determined that the spherical aberration correction by the liquid crystal panel 32 had been completed when the thickness error in the transparent substrate obtained by the transparent substrate thickness error detector 14 with respect to the ideal transparent substrate thickness has been within ±α.

Further, in this embodiment, the spherical aberration correction routine shown in FIG. 5 was executed at the time of changing of a recording layer for reproducing or recording data, what is called a focus jump. However, when the optical disk is changed to another disk, or even at the time of a long track jump in the same recording layer, the thickness difference in the transparent substrate is generated so that the spherical aberration occurs. Thus, even in these cases the spherical aberration correction routine is executed. In this case, as the value of spherical aberration correction signal AC to be supplied to the liquid crystal driver 4 in step S2, predictive correction values previously predicted in accordance with the jumping position with the disk radial direction, are used at the time of a long track jump. Further, at the time of a disk exchange, predictive correction values previously predicted in accordance with every disk type, are used. These predicted correction values are previously stored in for example, a memory provided in the controller 20.

Further, in this embodiment, after it was determined in the aberration correction completion determining circuit 50, 50' or 50" that the spherical aberration correction operation by the liquid crystal panel 32 had been completed, a reproducing operation (or recording operation) is resumed. However, since a response period of time for the liquid crystal device can be predicted depending on the outside-air temperature, the reproducing operation (or recording operation) may be resumed after the passage of only the prediction response period of time for this liquid crystal device.

Figure 11:
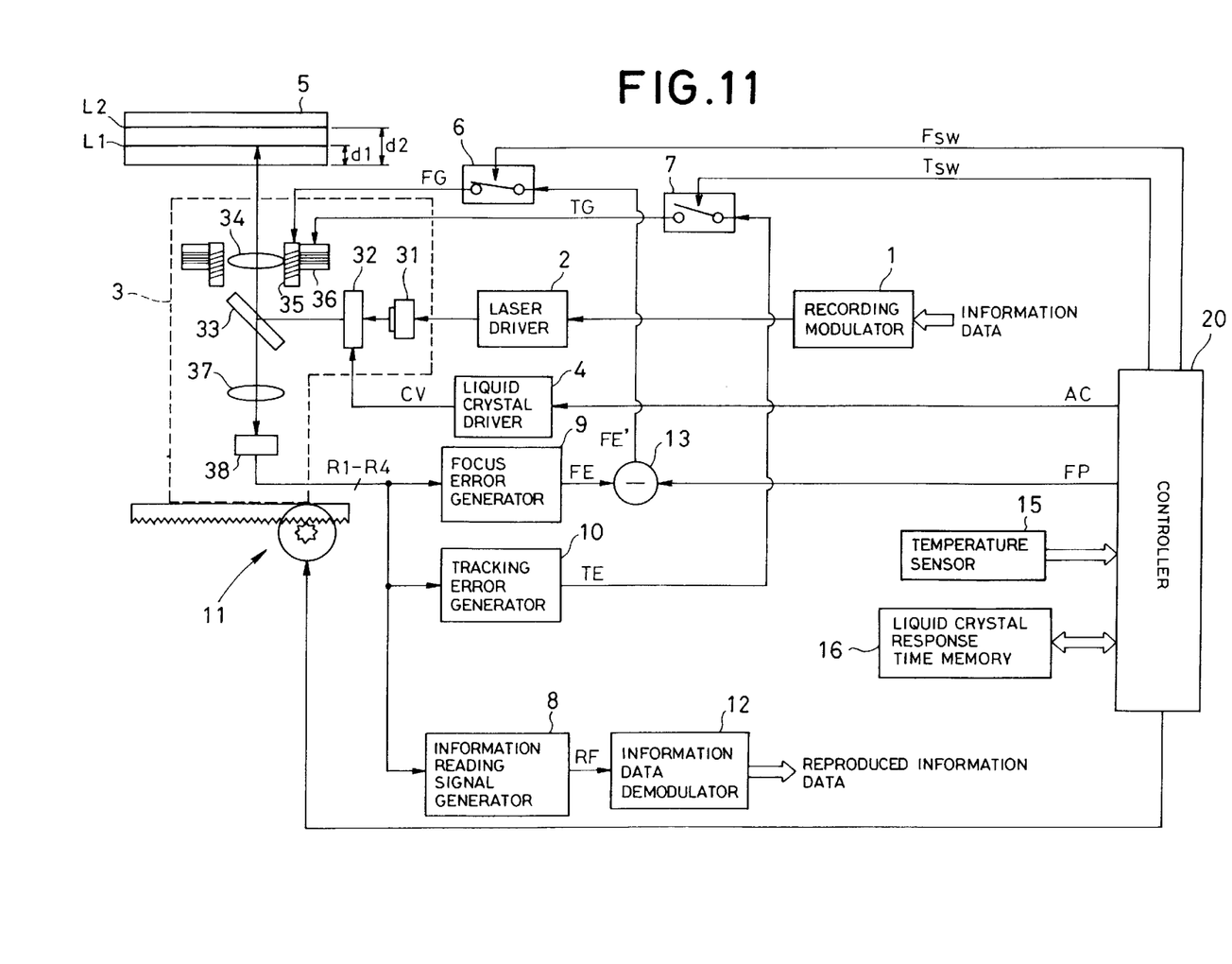
FIG. 11 is a diagram showing another structure of the optical information recording and reproducing apparatus.

FIG. 11 is a diagram showing a constitution of an optical information recording and reproducing apparatus according to another embodiment of the present invention, which was made taking such points into consideration.

The optical information recording and reproducing apparatus shown in FIG. 11 provides a temperature sensor 15, which measures the outside-air temperature, and a liquid crystal response time memory 16 in place of the aberration correction completion determining circuit 50 in the constitution of FIG. 1. The predictive response times of the liquid crystal device are stored in the liquid crystal response time memory 16 in accordance with every temperature. After the execution of step S2 shown in FIG. 5, the controller 20 reads the liquid crystal response time corresponding to the temperature measured with the temperature sensor 15 from the liquid crystal response time memory 16, and proceeds to the execution of the next step S4 after the passage of the liquid crystal response time.

As described above in detail, in the present invention the aberration correcting part which corrects the optical aberration is mounted in the optical information recording and reproducing apparatus. Further, in the present invention, the aberration correction amount in the aberration correcting part is changed, and it is determined whether or not the aberration correction by the aberration correcting part was completed based on a signal level read from the optical recording medium in the change of the aberration correction amount. When it is determined that the aberration correction has been completed, a reproducing operation or a recording operation is commenced.

Thus, according to the present invention, aberration generated in the optical system of an optical recording medium can be rapidly corrected and the recording and reproducing accuracy of information data is enhanced.

What is claimed is:

1. An optical information recording and reproducing apparatus for recording and reproducing of information data with respect to an optical recording medium comprising:

an optical system for photoelectrically converting a reflected light from said optical record medium into a conversion signal, while irradiating a recording surface of said optical recording medium with a laser beam;

an aberration correction part for correcting an aberration of said optical system;

an aberration correction completion determining part for determining whether or not an operation of an aberration correction by said aberration correction part was completed based on the level of said conversion signal; and a controller for starting a recording operation or a reproducing operation when it is determined that the operation of said aberration correction was completed by said aberration correction completion determining part, while changing an amount of said aberration correction.

2. The optical information recording and reproducing apparatus according to claim 1, wherein said aberration correction part comprises a liquid crystal panel in which an annular transparent electrode is formed on a liquid crystal layer filled with a liquid crystal having birefringence properties, and a liquid crystal drive circuit for applying an electric potential according to said amount of said aberration correction to said transparent electrode to change a spherical aberration of light passing said liquid crystal panel.

3. The optical information recording and reproducing apparatus according to claim 2, wherein said optical system comprises a laser generator for generating said laser beam, an objective lens for condensing said laser beam onto the recording surface of said optical recording medium, and a photo detector for photoelectrically converting said reflected light from said optical record medium into said conversion signal, and wherein said liquid crystal panel is provided between said laser generator and said objective lens in said optical system.

4. The optical information recording and reproducing apparatus according to claim 1, further comprising a tracking error generator for generating a tracking error signal based on said conversion signal, wherein when said tracking error signal level is larger than a predetermined level, said aberration correction completion determining part determines that said operation of said aberration correction by said aberration correction part is completed.

5. The optical information recording and reproducing apparatus according to claim 1, further comprising a prepit detecting part for detecting an addressing prepit formed in said optical recording medium based on said conversion signal to generate a prepit detecting signal, wherein when said prepit detecting signal level is larger than a predetermined level, said aberration correction completion determining part determines that said operation of said aberration correction by said aberration correction part is completed.

6. The optical information recording and reproducing apparatus according to claim 1, wherein a plurality of said recording layers are formed in said optical recording medium, and said controller for changing said amount of said aberration correction when said recording layer for reproducing and recording is changed to another recording layer.

7. The optical information recording and reproducing apparatus according to claim 1, wherein a plurality of said recording layers are formed in said optical recording medium, and said controller for changing said amount of said aberration correction when a long track jump is carried out in the same recording layer.

8. The optical information recording and reproducing apparatus according to claim 1, wherein a plurality of said recording layers are formed in said optical recording medium, and said controller for changing said amount of said aberration correction when said optical recording medium is exchanged.

* * * * *